United States Patent [19]
Pollack et al.

[11] Patent Number: 5,022,040
[45] Date of Patent: Jun. 4, 1991

[54] UPCONVERSION PUMPED LASERS

[75] Inventors: Slava A. Pollack, Palos Verdes Estate; David B. Chang, Tustin, both of Calif.

[73] Assignee: Hughes Aircraft Company, Los Angeles, Calif.

[21] Appl. No.: 607,203

[22] Filed: Oct. 30, 1990

Related U.S. Application Data

[63] Continuation of Ser. No. 357,240, May 26, 1989, abandoned, which is a continuation-in-part of Ser. No. 183,509, Apr. 14, 1988, abandoned, which is a continuation-in-part of Ser. No. 869,270, May 30, 1986, abandoned.

[51] Int. Cl.$^5$ ................................................ H01S 3/09
[52] U.S. Cl. .......................................... 372/69; 372/41
[58] Field of Search ......................... 372/69, 97, 66, 76, 372/68, 39, 41

[56] References Cited

U.S. PATENT DOCUMENTS

| | | | |
|---|---|---|---|
| H000,006 | 12/1985 | White | 372/5 |
| 3,913,033 | 10/1975 | Tuccio et al. | 372/34 |
| 4,088,964 | 5/1978 | Clow | 372/93 |
| 4,205,278 | 5/1980 | George et al. | 372/41 |
| 4,272,733 | 6/1981 | Walling et al. | 372/41 |
| 4,287,482 | 9/1981 | Wert, III | 372/19 |
| 4,410,992 | 10/1983 | Jonan | 372/32 |
| 4,490,822 | 12/1984 | Walling et al. | 372/41 |
| 4,782,494 | 11/1988 | Pollack | 372/91 |

OTHER PUBLICATIONS

Gomelauri et al.; Single-Mode Q Switched $CaF_2:Er^{+3}$ Laser Jour. Quant. Elect., vol. 6, No. 3; p. 341; Mar. 1976.
"Erbium-Doped $CaF_2$ Crystal Laser Operation at Room Temp." Batygov et al.; Sov. Jour. Quant. Elect.; vol. 4, No. 12, Jun. 75.

Primary Examiner—Léon Scott, Jr.
Attorney, Agent, or Firm—Michael W. Sales; Wanda K. Denson-Low

[57] ABSTRACT

A laser incorporating a laser medium disposed within a laser cavity and a pumping arrangement for selectively applying excitation energy to said laser medium. The laser medium contains upconverting material of the type which allows for the exchange of energy between electrons of the lasing ions at a given energy state below the meta-stable initial lasing state so that some of said exchanging electrons are upconverted to energy states at or above the meta-stable initial lasing state. The pumping arrangement applies energy of suitable wavelength and intensity for elevating electrons from energy levels below the given state to that state in sufficient numbers to support substantial upconversion and the resulting lasing.

23 Claims, 14 Drawing Sheets

TIME (2m SEC/DIVISION)

TIME (2m SEC/DIVISION)

UPCONVERSION PUMPED LASERS

CROSS REFERENCE TO A RELATED APPLICATION

This is a continuation of application Ser. No. 07/357,240, filed May 26, 1989 now abandoned; which is a continuation-in-part of U.S. application Ser. No. 07/183,509 filed Apr. 14, 1988 (now abandoned); which in turn is a continuation in part of application Ser. No. 869,270, filed May 30, 1986 also abandoned.

U.S. application, Ser. No. 06/868,929, entitled "Method of Providing Continuous Lasing Operation" filed concurrently with the subject application by the same inventors.

BACKGROUND OF THE INVENTION

This invention relates generally to the laser art and more particular to lasers which utilize upconversion-type materials as the lasing medium.

It is well known that some rare earth ions, when incorporated as impurities in sufficient concentration into a suitable host lattice, can upconvert infrared radiation to various shorter wavelengths. Upconversion, i.e., the conversion of long-wave into short-wave radiation by certain solids, without assistance of auxiliary radiation, can be accomplished by several multiphoton mechanisms. However, only one, the cooperative excitation mechanism, is thought to be efficient enough to be practical. The latter mechanism proceeds according to a scheme in which the ground-state electrons of several atoms (ions) absorb one infrared photon each. The energy subsequently migrates through a nonradiative process to a single atom exciting it to a higher energy level with ensuing fluorescence.

It has been proposed some time ago to utilize this mechanism for optical laser pumping; "Infrared-Pumped Visible Laser", L. F. Johnson, H. J. Guggenheim, Appl. Phys. Lett., Vol. 19, No. 2, pg. 44, 1971. Using conventional optical pumping, the population inversion of a lasing state is achieved through absorption of radiation by the laser active medium into energy states lying at or above the meta-stable lasing state. Subsequently, the energy is transferred to a lasing state (if previously above) via radiative and/or nonradiative transitions. In contrast, the upconversion optical pumping scheme is based on up-conversion of radiation absorbed into an energy level lying below the initial lasing state.

Pumping of a solid state infrared laser with upconverted vibrational energy has also been reported; "Solid-State Vibrational Laser - KBr:CN−", R. W. Tkatch, T. R. Gosnell, A. J. Sievers, Optics Letters, Vol. 10, No. 4, pg. 122, 1984.

SUMMARY OF THE INVENTION

A laser arrangement in accordance with one embodiment of the subject invention incorporates a laser medium disposed within a laser cavity and pumping means for selectively applying excitation energy to said laser medium. The laser medium contains upconverting material of the type which allows for the exchange of energy between electrons of the lasing ions at a given energy state below the meta-stable initial lasing state so that some of said exchanging electrons are upconverted to energy states at or above the metastable initial lasing state. The pumping means applies energy of suitable wavelength and intensity for elevating electrons from energy levels below the given state to that state in sufficient numbers to support substantial upconversion and the resulting lasing. In a particular embodiment the laser medium comprises a rod of calcium fluoride crystal hosting erbium ions, the laser cavity is tuned to 2.8 $\mu$m, the pumping means applies 1.54 $\mu$m photon energy and lasing is between the $^4I_{11/2}$ and $^4I_{13/2}$ energy states. In accordance with one aspect of the invention in which the given energy state is the terminal state of the lasing transition for the laser medium and in which the concentration of upconverting material is such that exchange of energy between electrons of said terminal energy state is sufficient to maintain population inversion between the initial and terminal lasing states, the continuous lasing operation can be sustained in response to continuous excitation by the pumping means.

The energy level scheme relating to the above referenced $^4I_{11/2} \to ^4I_{13/2}$ transition is illustrated in FIGS. 2 and 11. The two photon, two ion upconversion process proceeds as follows: two $Er^{3+}$ ions absorb 1.54 $\mu$m photons exciting them to the $^4I_{13/2}$ state. This state has a long lifetime, approximately 20 msec and, thus, probability for direct electron relaxation from $^4I_{13/2}$ to the ground state is small. Therefore, the ions exchange energy via a dipole-dipole interaction. As a result of this interaction, one ion is excited to the third excited state, $^4I_{9/2}$, and the second ion relaxes to the ground state. Through a nonradiative transition, electrons cascade from $^4I_{9/2}$ to the second $^4I_{11/2}$ state inverting its population with respect to the first $^4I_{13/2}$ state. When excitation radiation intensity is sufficiently high, the population inversion at the $^4I_{11/2}$ state reaches a sufficient level for overcoming the cavity losses, and laser emission occurs between the $^4I_{11/2}$ and $^4I_{13/2}$ states with the resultant emission of 2.8 $\mu$m radiation. It is noted that in the just discussed lasing scheme the pumping energy was a shorter wavelength (1.54 $\mu$m) than the lasing energy (2.8 $\mu$m) produced, as a result of the lasing energy band selected, e.g., cavity mirror spacing (see FIG. 13). However, it is submitted that nevertheless the laser is upconversion pumped in the sense that the transition to the upper laser state ($^4I_{11/2}$ via $^4I_{9/2}$) was by upconversion from the $^4I_{13/2}$ state.

In accordance with a further disclosed embodiment, a thin graphite foil is disposed in the lasing path of a laser cavity and the laser is Q-switched by vaporizing a portion of the foil by means of laser energy applied from another source.

A primary object of the subject invention is to provide new and improved lasers.

Another object of the subject invention is to provide an upconversion pumped laser.

Another object is to provide a solid state laser arrangement which achieves optical pumping through upconversion.

Yet another object is to provide a solid state laser which lases at room temperatures and with relatively low energy input.

BRIEF DESCRIPTION OF THE DRAWINGS

The novel features that are considered characteristic of this invention are set forth with particularity in the appended claims. The invention itself, both as to the organization and method of operation as well as additional objects and advantages thereof, will best be understood from the following description when read in connection with the accompanying drawings in which like reference numerals refer to like parts and in which:

DESCRIPTION OF THE PREFERRED EMBODIMENTS

Erbium contained as an impurity in many host lattices can upconvert 1.5 μm and 980 nm radiation with or without assistance of a sensitizer. Some pure erbium compounds, e.g., $ErF_3$, also exhibit this property. The radiation is absorbed or transferred to the $^4I_{13/2}$ and/or $^4I_{11/2}$ states of the $Er^{3+}$ ion and is converted to several visible and infrared bands. Alkaline-earth-fluoride crystals doped with a few mole percent of erbium are characterized by a very efficient upconversion.

Figure 1:
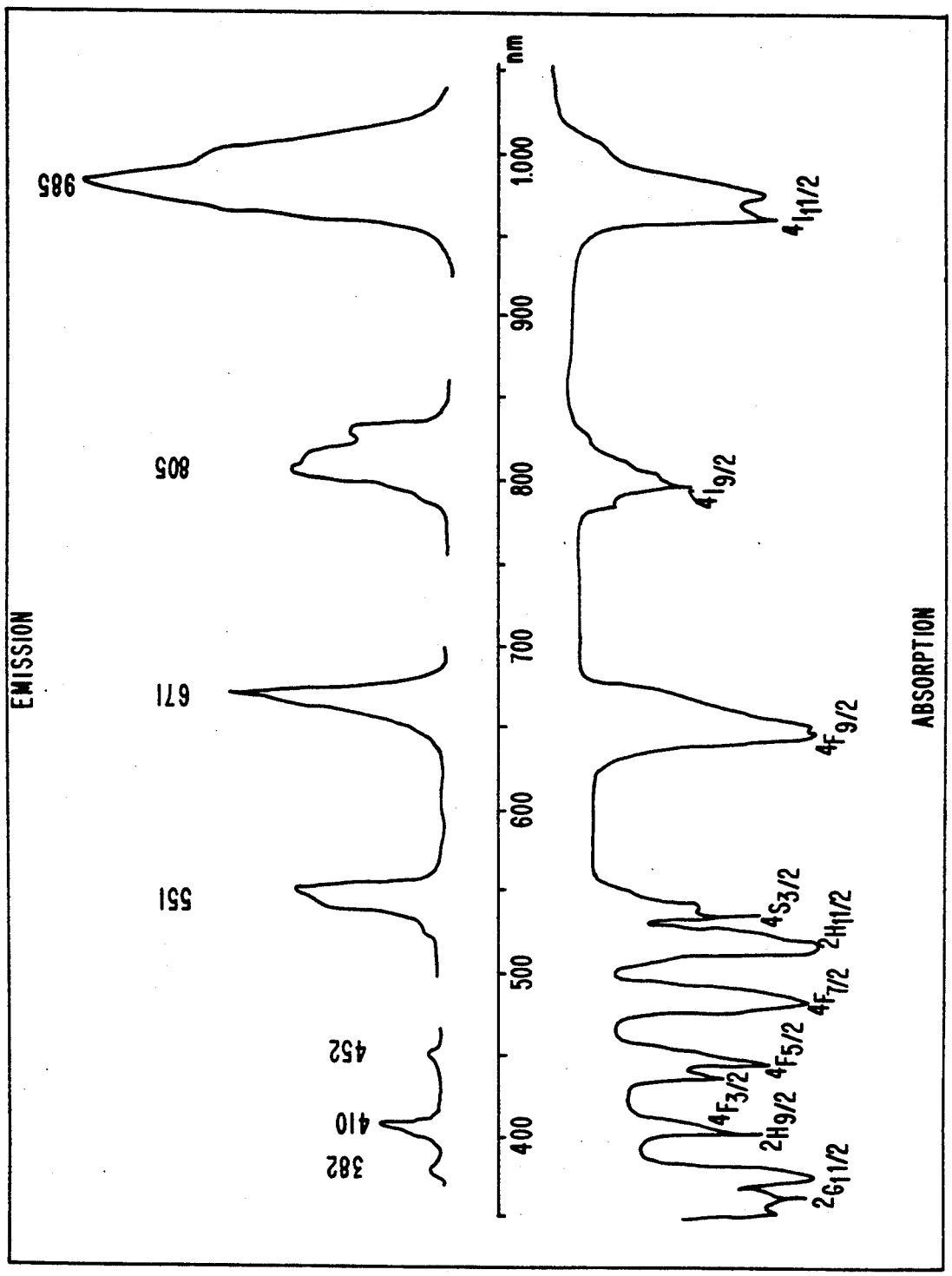
FIG. 1 depicts the absorption and emission bands of $CaF_2$ (10% $Er^{3+}$). Emission is excited by upconverted 1.5 μm radiation. Relative intensities of emission bands are not drawn to scale.
Figure 2:
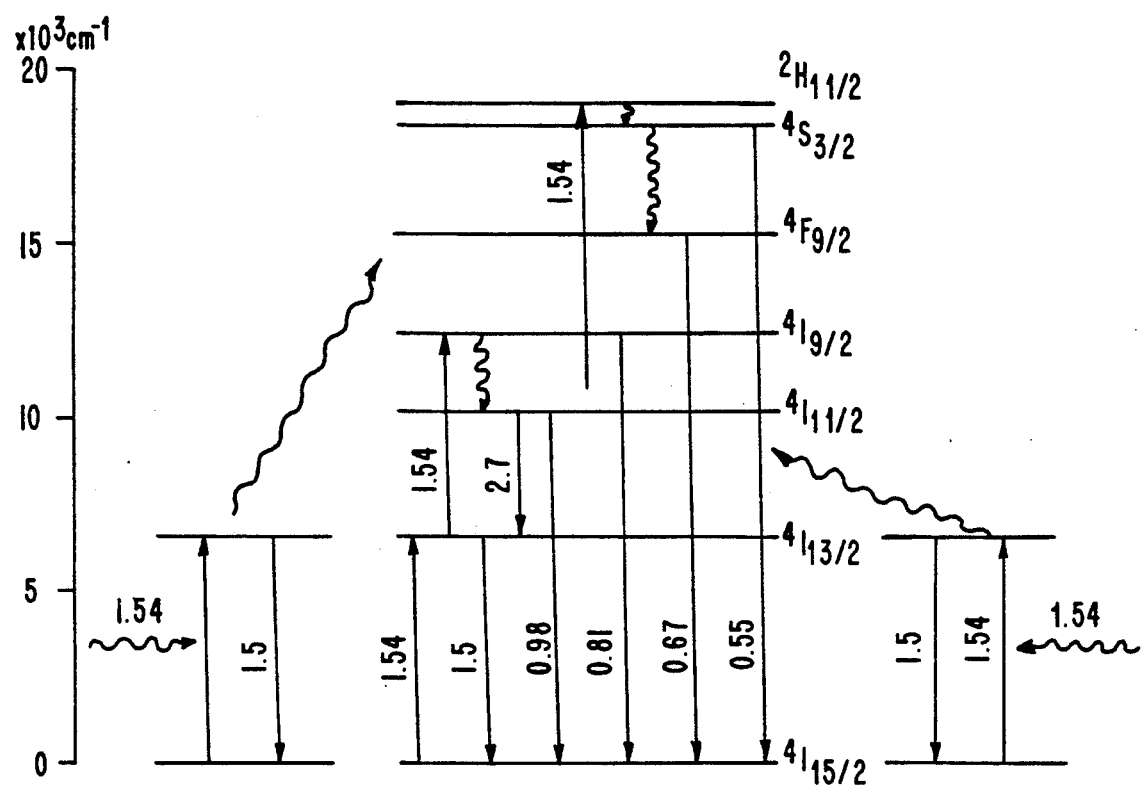
FIG. 2 depicts the energy level diagram of $Er^{3+}$ ion and upconversion excitation scheme.

Absorption of 1.5 μm radiation in $CaF_2$ (10% $Er^{3+}$) results in emission of seven bands in the red to violet region of the spectrum ranging in wavelengths from 985 to 382 nm, as shown in FIG. 1 with the emission and absorption bands juxtaposed. FIG. 2 shows the energy level diagram of the $Er^{3+}$ ion and an excitation scheme for the principal upconverted bands. In addition to the bands shown in FIG. 1, three bands in the infrared, around 2.7, 2.0, and 1.15 μm, have also been observed. These bands arise from the transitions between the $Er^{3+}$ excited states, viz. $^4I_{11/2} \rightarrow {}^4I_{13/2}$, $^4F_{9/2} \rightarrow {}^4I_{11/2}$ and $^4F_{9/2} \rightarrow {}^4I_{13/2}$, respectively.

The relative band intensities, excluding the weak 2.0 and 1.15 μm bands, corrected for the detector and monochromator sensitivities and normalized to the intensity of the resonant 1.65 μm band, are given in Table I. It can be seen that the strongest upconverted emission occurs from the $^4I_{11/2}$ state.

TABLE I

| λ, nm | Initial State | Relative Intensity |
| --- | --- | --- |
| 2,700 | $^4I_{11/2}$ | 0.22 |
| 1,615 | $^4I_{13/2}$ | 1 |
| 985 | $^4I_{11/2}$ | 0.58 |
| 828 | $^4I_{9/2}$ | $2.8 \times 10^{-2}$ |
| 670 | $^4F_{9/2}$ | 0.17 |
| 550 | $^4S_{3/2}$ | $9.3 \times 10^{-2}$ |
| 452 | $^4F_{5/2}$ | $1.8 \times 10^{-4}$ |
| 410 | $^2H_{9/2}$ | $1.7 \times 10^{-3}$ |
| 382 | $^2G_{11/2}$ | $1.2 \times 10^{-5}$ |

Without a $Yb^{3+}$ sensitizer, upconversion of 980 nm in $CaF_2$ ($Er^{3+}$) is weak. Only two emission bands at 671 and 551 nm are detectable; however, their intensities are two orders of magnitude weaker than the intensities of their counterparts excited by upconversion of 1.5 μm radiation.

Figure 3:
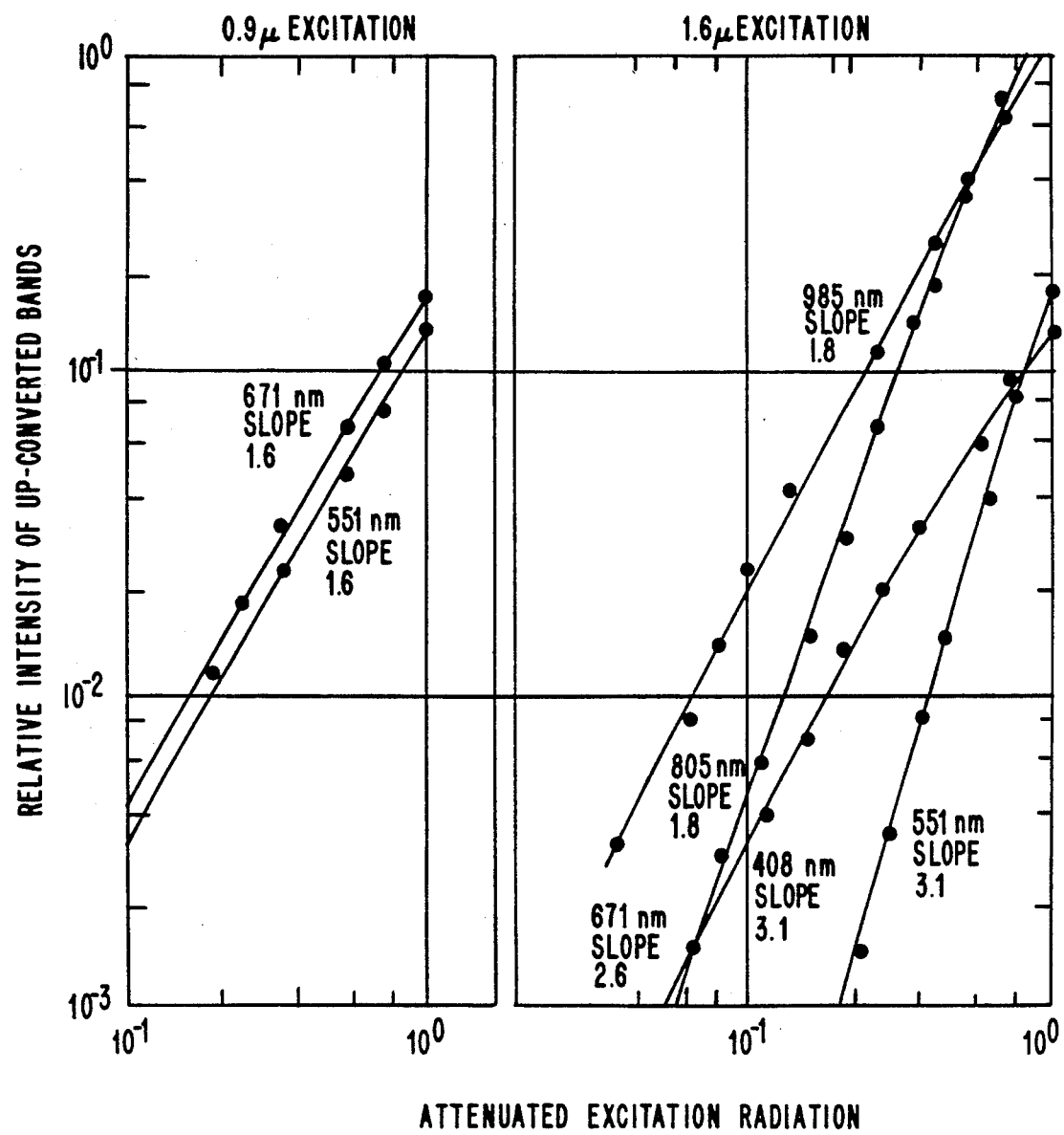
FIG. 3 depicts the relative intensities of major upconverted bands versus relative intensities of 1.6 μm and 0.9 μm excitation radiation.

The excitation schemes shown in FIG. 2 are derived from the results of relative intensity measurements of upconverted bands versus attenuated excitation radiation, shown in FIG. 3. It follows from the slopes of the plotted curves that the intensities of the 671 and 551 nm bands have a cubic dependence, and the intensities of the 985 and 805 nm bands, a quadratic dependence on the intensity of 1.5 μm excitation radiation. In other words, the first and the last two bands are the results of three and two photon upconversion processes, respectively.

Figure 4:
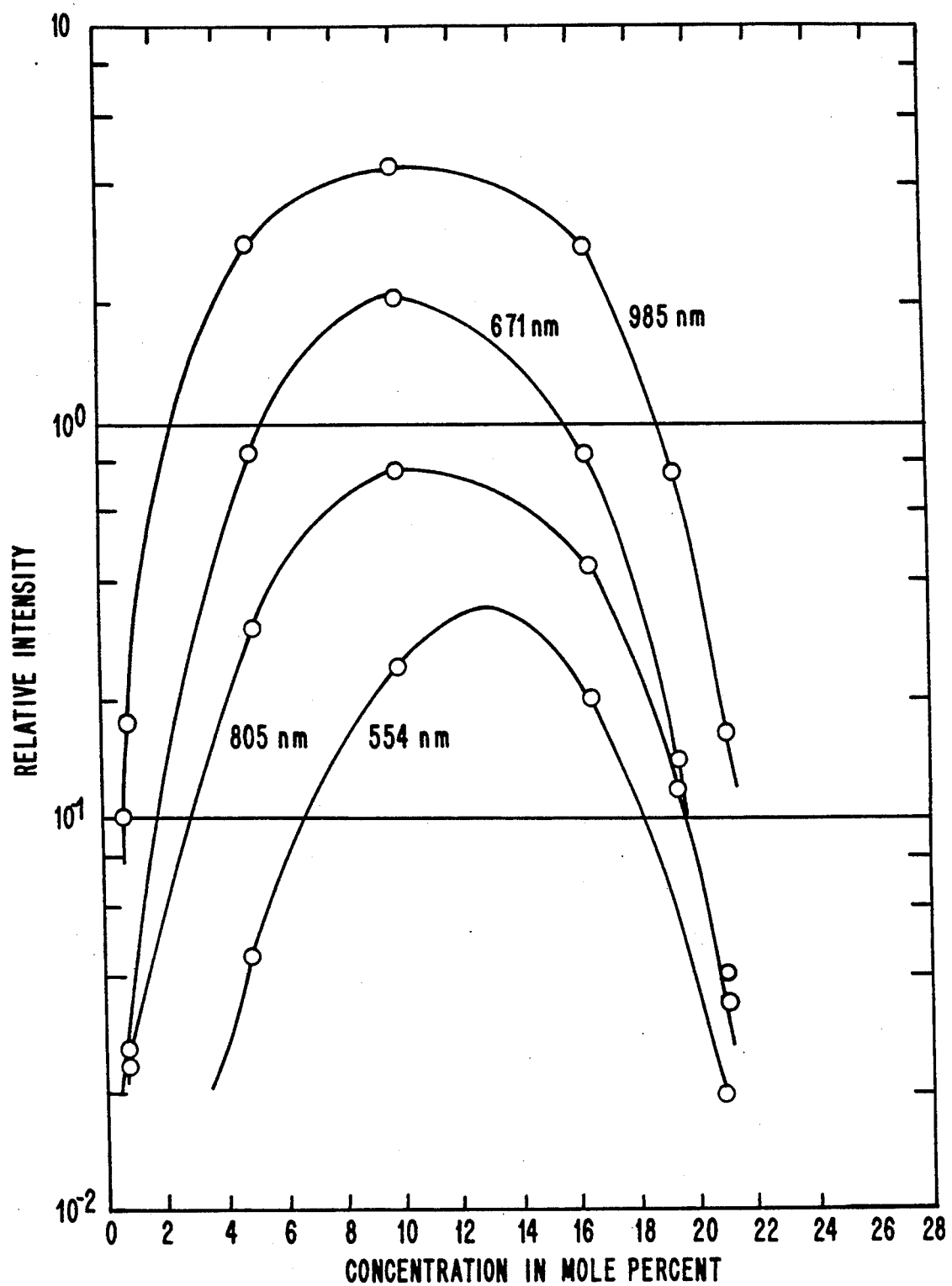
FIG. 4 depicts the dependence of relative intensities of upconverted bands on concentration of $Er^{3+}$ ions in $CaF_2$.
Figure 5:
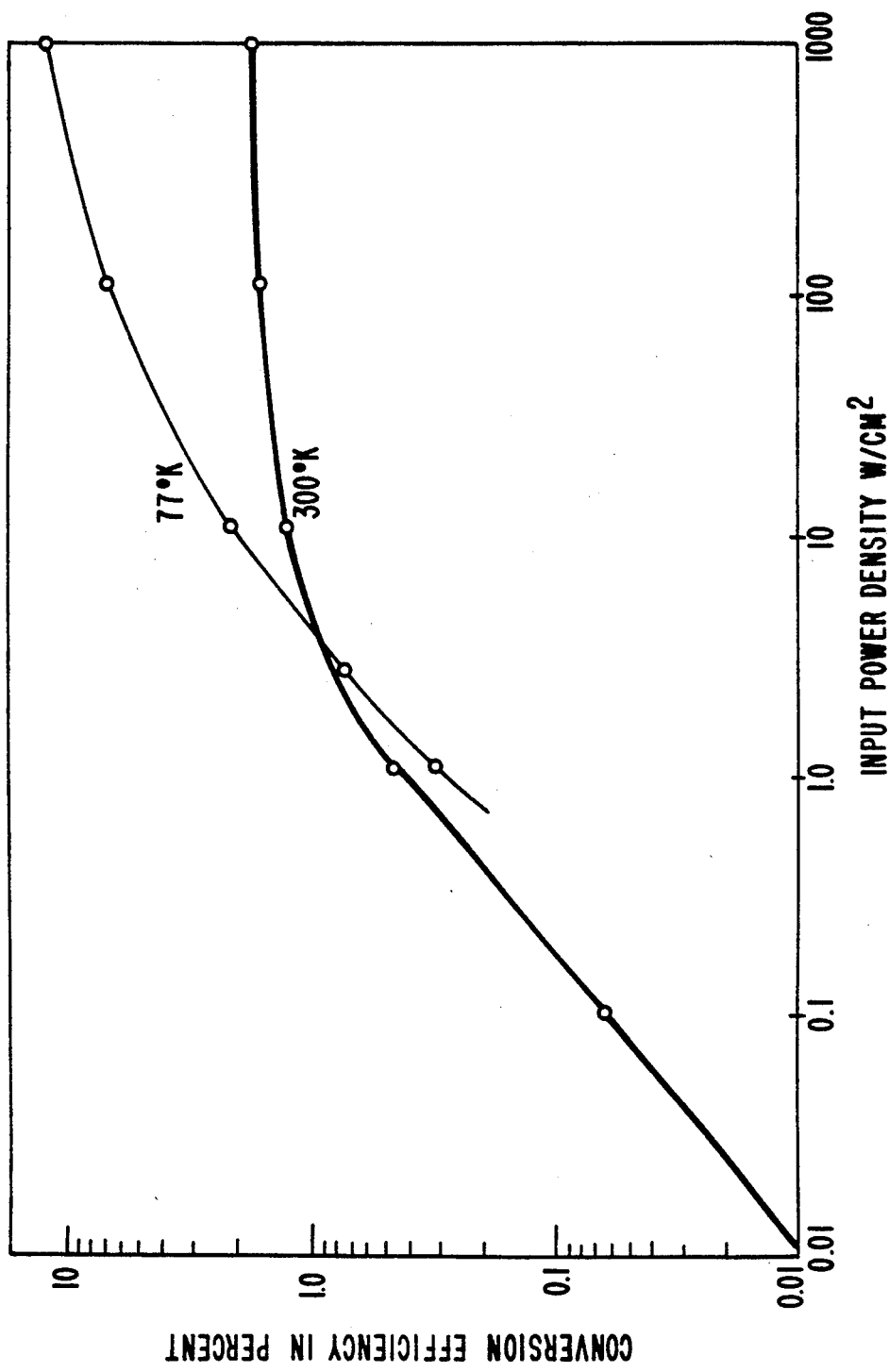
FIG. 5 depicts the upconversion efficiency for visible bands versus intensity of 1.5 μm excitation radiation.

FIG. 4 shows the dependence of the relative intensity of upconverted bands on the concentration of $Er^{3+}$ ions in $CaF_2$, and FIG. 5 shows the conversion efficiency of the visible bands as a function of input power density. It follows from FIG. 4 that the strongest upconversion occurs when the concentration of $Er^{3+}$ ion is around 10 mole percent.

Figure 6:
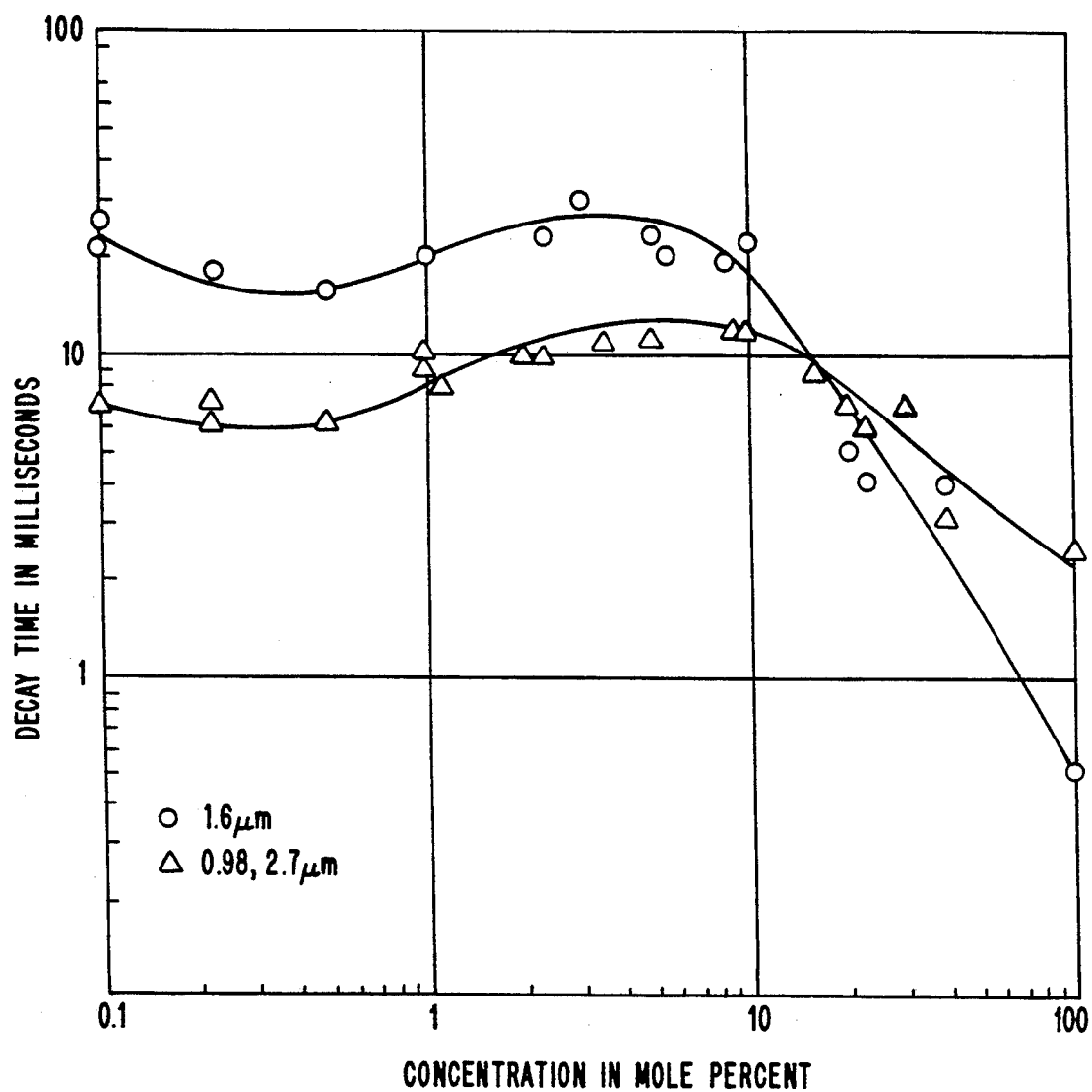
FIG. 6 depicts the lifetimes of $^4I_{11/2}$ and $^4I_{13/2}$ at room temperature versus concentration of $Er^{3+}$ ions in $CaF_2$.

In order to select the proper concentration of $Er^{3+}$ ion in $CaF_2$, various important parameters associated with this transition were measured as a function of concentration. FIG. 6 shows the measured lifetimes of the initial $^4I_{11/2}$ and $^4I_{13/2}$ states as the function of concentration at room temperature.

The measurements were performed by exciting the samples with the filtered short-wave radiation of short duration (20μsec) xenon flash lamp pulses. It should be noted at this juncture that, generally, the decay curves of fluorescence bands produced by conventional flash lamp excitation technique are different from the decay curves of the same emission bands excited by upconverted IR short duration pulses. In the former case, the decay curve time constants represent the lifetimes of the excited states from which fluorescence originates; in the latter case, the time constants are related to the lifetime of an intermediate state, such as $^4I_{13/2}$.

It can be seen from FIG. 6 that the lifetime of the upper state $\tau_2$ is shorter than the lifetime of the lower state $\tau_1$ up to $Er^{3+}$ ion concentrations of around 20 mole percent. Laser transitions between states for which the inequality $\tau_2 < \tau_1$ holds were heretofore generally thought to be self-saturating. A main difficulty encountered in exciting the self-saturating lasers lies in producing sufficient population inversion between the operating levels. The use of 20 mole percent concentration of $Er^{3+}$ in $CaF_2$ was prevented because the excessive concentration affects the laser rod's optical quality and thus its ability to lase.

The $^4I_{11/2} \rightarrow {}^4I_{13/2}$ transition laser emission was reported some time ago in $CaF_2$ doped with $Er^3$ and $Tm^{3+}$ ions; "Thermal Switching of Laser Emission of $Er^{3+}$ at $2.69\mu$ and $Tm^{3+}$ at $1.86\mu$ in Mixed Crystals of $CaF_2:ErF_3:TmF_3$"; M. Robinsson, D. P. Devor; Applied Physics Letters, Vol. 10, No. 5, pg. 167, 1967. The addition of $Tm^{3+}$ ions was intended to shorten the lifetime of the $^4I_{13/2}$ state through nonradiative energy transfer from $Er^{3+}$ to $Tm^{3+}$ ions. Such a transfer has previously been reported by Johnson, et al; "Energy Transfer From $Er^{3+}$ to $Tm^{3+}$ and $Ho^{3+}$ Ions in Crystals", Phys. Rev., Vol. 133, Number 2A, pg. A494, 1964. Lasing was produced at room temperature with the reported threshold of only 10 Joules.

Since then, this laser emission of $Er^{3+}$ between the $^4I_{11/2}$ and $^4I_{13/2}$ states, occurring around 3 $\mu$m, has been produced in more than a dozen different host materials; A. A. Kaminskii, Laser Crystals, Springer Series in Optical Sciences, Editor D. L. MacAdam, Vol. 14, Springer-Verlag, Berlin, Heidelberg, New York, 1981. In many hosts, including $CaF_2$, the $Er^{3+}$ ion lases without deactivating ion assistance.

Most 3 $\mu$m erbium lasers have the following properties in common: (1) they operate at room temperature, (2) they require high erbium ion concentration for low pump energy, and (3) they are characterized by a terminal state/initial state lifetime ratio greater than one; in some host materials this ratio exceeds ten. Surprisingly, these laser operate quite well in a pulsed mode at room temperature with low pump energy.

To explain pulsed lasing, a hypothesis was put forward taking into account Stark splitting of the $^4I_{11/2}$ and $^4I_{13/2}$ excited states; A. A. Kaminskii, Laser Crystals, Springer Series in Optical Sciences, Editor D. L. MacAdam, Vol. 14, Springer-Verlag, Berlin, Heidelberg, New York, 1981. They are split into six and seven Kramers' doublet components, respectively, in crystalline fields of low symmetry. According to this hypothesis, the $^4I_{11/2} \rightarrow {}^4I_{13/2}$ lasing process proceeds as follows. The short optical pumping pulse of an xenon flash lamp preferentially populates (with or without the aid of a sensitizer) the upper $^4I_{11/2}$ state, leaving the levels of the terminal $^4I_{13/2}$ state manifold empty or sparsely populated. The population inversion produced at the levels of the $^4I_{11/2}$ manifold results in self-saturated laser transitions to various levels of the terminal state manifold. The shorter wavelength laser lines rapidly disappear from the spectrum because the lower lying levels of the terminal manifold saturate faster. Only the longest wavelength lines, arising from transitions which terminate on the upper levels of the terminal manifold, persist longer and can be observed in the late laser spectrum. This is the so-called "red shift" of the spectral lines of self-saturating lasers.

Figure 7:
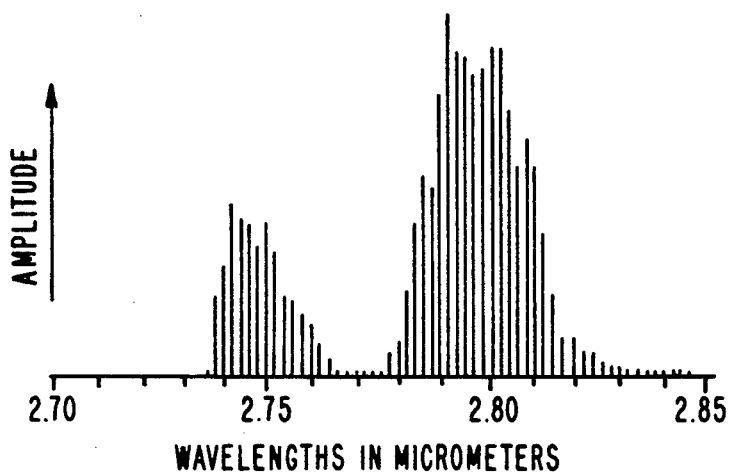
FIG. 7 depicts the spectral output of $^4I_{11/2} \rightarrow {}^4I_{13/2}$ laser transition in $CaF_2$ ($Er^{3+}$) in a vacuum at room temperature.
Figure 8:
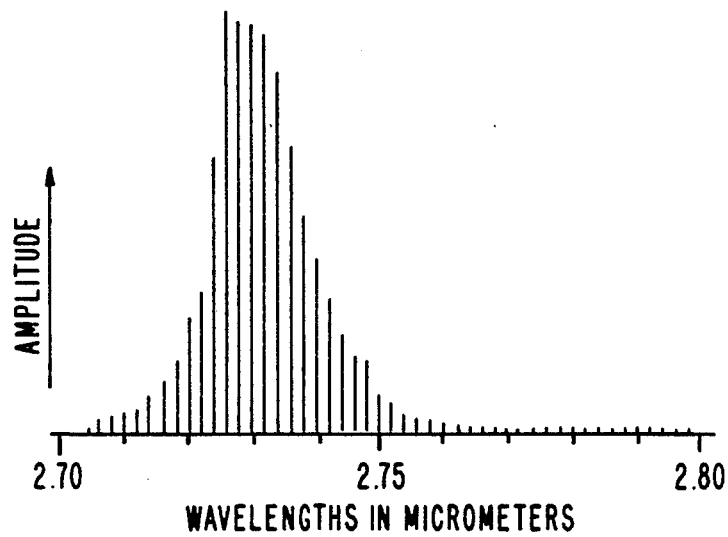
FIG. 8 depicts the spectral output of $^4I_{11/2} \rightarrow {}^4I_{13/2}$ laser transition in $CaF_2$ ($Er^{3+}$) in 100 mm Hg of $CO_2$ at room temperature.

The $^4I_{11/2} \rightarrow {}^4I_{13/2}$ laser transition of $Er^{3+}$ in $CaF_2$ occurring in 2.7–2.8 $\mu$m spectral region coincides with the strong absorption regions of $CO_2$ and $H_2O$ molecules; therefore, presence of these molecules in the laser cavity affects the position and number of the observed bands in the laser spectrum. To illustrate this effect, FIG. 7 shows the low resolution spectrum produced in vacuum, and FIG. 8 shows the spectrum obtained when the laser cavity was filled with 100mm Hg of $CO_2$. Since a pulsed laser was used, the spectra was recorded point-by-point by advancing the monochromator dial 5 nm at a time, which was the monochromator's resolution limit.

At medium-to-high constant laser excitation levels, the output spectrum, i.e., the shape of the recorded bands, remained fairly constant and reproducible from one recording run to the next; whereas, at the low excitation levels, a considerable amount of "line hopping" was observed, within as well as outside the recorded bands, resulting in changed spectral output and band shapes from pulse-to-pulse. This observation indicates the existence of a finer structure in these bands.

Figure 9:
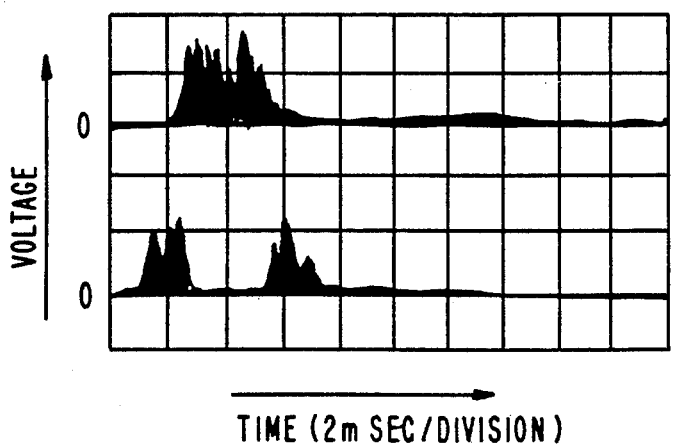
FIG. 9 depicts the time resolved $CaF_2$ ($Er^{3+}$) laser emission at 2.75 μm (lower trace) and 2.80 μm (upper trace).

It follows from FIG. 7 that in vacuum, emission occurs in two bands centered around 2.75 and 2.80 $\mu$m. Resolution limitation did not allow the recording of the fine details of these bands; however, they provided the opportunity to verify the existence of the above postulated red shift. For this purpose, the laser beam was split with the aid of a beam splitter in two components. Each component was fed into a monochromator equipped with an InAs detector. One monochromator was set at 2.75 $\mu$m, while the other one was set at 2.80 $\mu$m. The predicted red shift was indeed observed in the laser spectrum, as shown in FIG. 9; however, the long wavelength emission did not persist to the end. Through some mechanism, the lower levels of the terminal manifold were again emptied, restoring the short wavelength emission that dominated the late laser spectrum.

Figure 10:
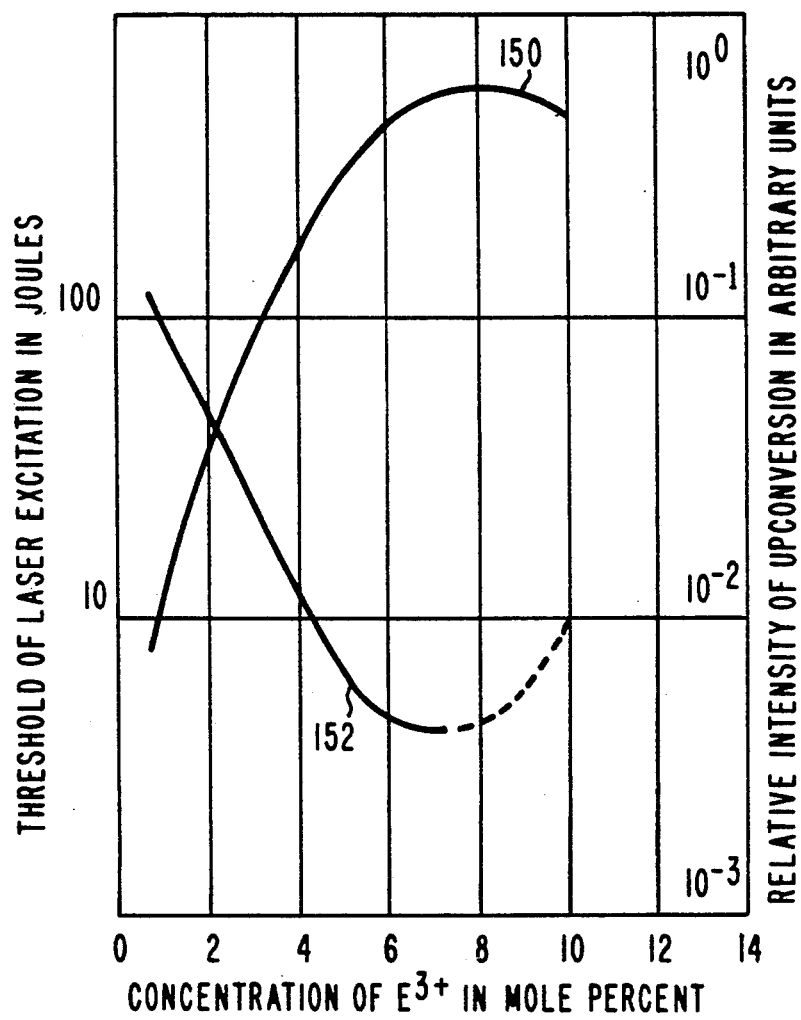
FIG. 10 depicts threshold pumping energy (bottom curve 152) and intensity of upconverted radiation (top curve 150) as functions of $Er^{3+}$ ion concentration in $CaF_2$.

It is hypothesized that this mechanism was energy state upconversion. This hypothesis was bolstered by another observation. When the relative intensity of up-converted radiation in samples of $CaF_2$ ($Er^{3+}$) is plotted versus concentration, and threshold energy of laser made from the same samples versus concentration the two curves which are juxtaposed in FIG. 10 were obtained. It can be seen that both represent a similar but inverted functional dependence on $Er^{3+}$ ion concentration. Because of deteriorating laser rod optical quality with increasing concentration, comparison could not be extended beyond 5–10 mole percent concentration.

Figure 13:
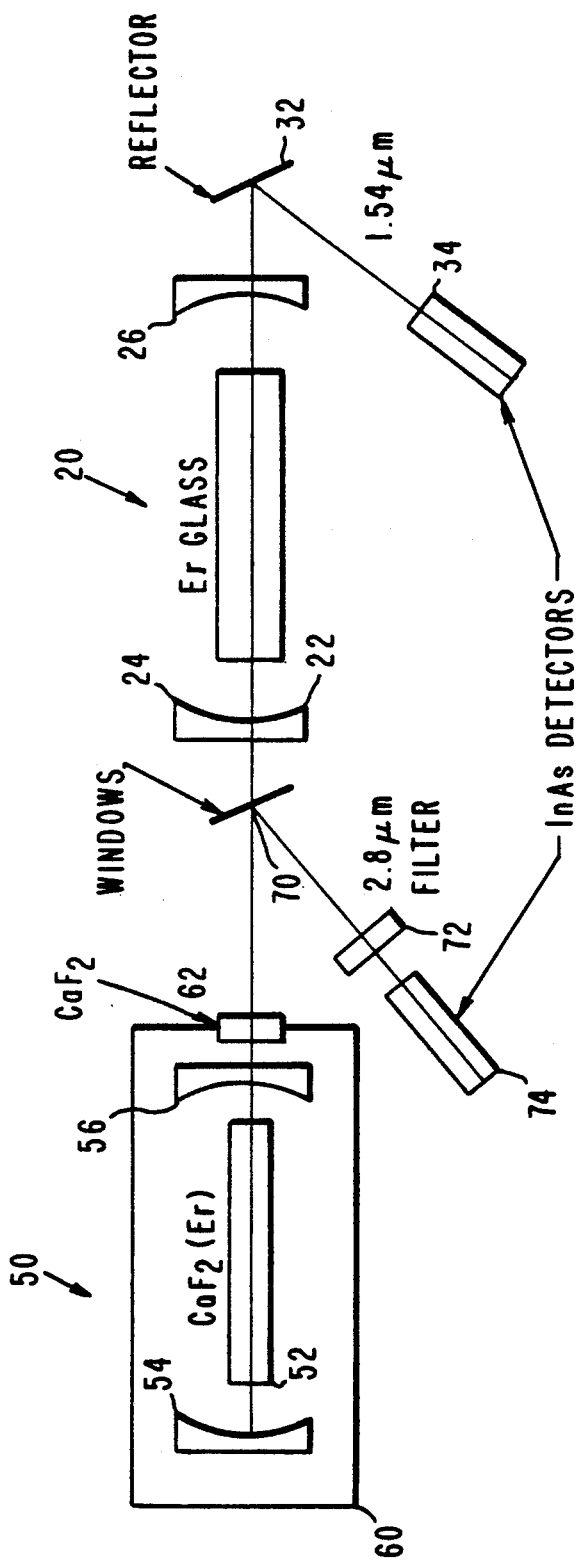
FIG. 13 is a schematic diagram of an upconversion pumped laser arrangement in accordance with the invention.

In the embodiment of the invention shown in FIG. 13, an erbium glass laser 20 emitting at 1.54 $\mu$m is used to pump a $CaF_2$ (5% $Er^{3+}$) laser 50 emitting at 2.8 $\mu$m.

Figure 12:
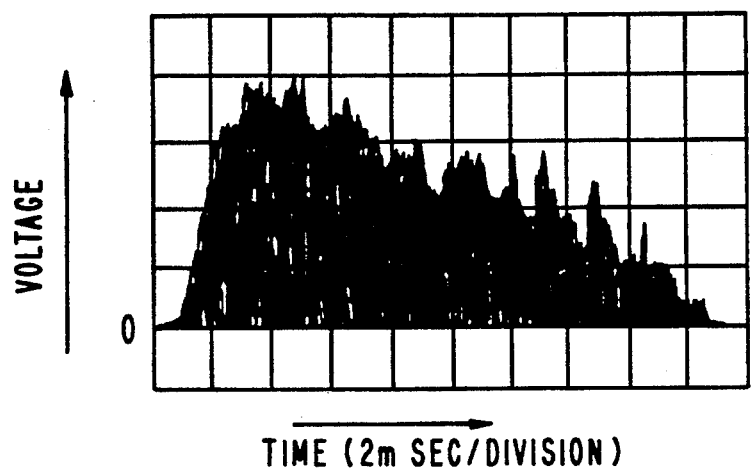
FIG. 12 depicts the laser emission at 2.8 μm in $CaF_2$ ($Er^{3+}$) excited by 1 msec xenon flash lamp pulse at room temperature.

The selected $CaF_2$ (5 mole percent $Er^{3+}$) laser rod 52 was tested in air at room temperature for energy output efficiency and other laser characteristics. A xenon flash lamp was used for excitation, in a cavity with ZnSe concave (1 m radius) dielectric mirrors with 90 and 99.5 percent reflectivity (in the test arrangement). The pump energy threshold was about 15 Joules. Output energies in excess of 0.5 Joule per pulse and peak power over 30 watts were achieved at input energies of 150–200 Joules into the flash lamp, with a slope efficiency in excess of 0.3 percent. The spiking laser pulse, 17 msec in duration, is shown in FIG. 12. The energy and power output values given above were not optimized by varying reflectivity of the outcoupling mirror. The unusually long lasing persistence, excited by the xenon flash lamp pulse lasting only 1 msec, suggests a possibility of the excitation energy being recycled through upconversion inside the laser rod. This result is in agreement with a theoretical analysis which sets the upper limit for the upconversion excited lasing persistence equal to the lifetime of the terminal state, i.e., to 20 msec.

Again referring primarily to FIG. 13, pumping laser 20 includes erbium glass rod 22 and end mirror 24 and 26 as well as flash lamps and associated elliptical reflectors (not shown but well known in the art). It is noted that any suitable pumping laser may be utilized.

Laser 50 (FIG. 13) includes $CaF_2$ ($Er^{3+}$) rod 52 and ZnSe concave end mirrors 54 and 56. Rod 52 was grown by Optovac, Inc., and has two ground and polished parallel plane ends without anti-reflection coating. Rod 52 may be incorporated within gold plated elliptical reflectors with xenon flash lamps (not shown) for alignment and optional supplemental power purposes. Mirrors 54 and 56 are 99.5% reflective to 2.8 $\mu$m energy. The foregoing elements of laser 50 are enclosed within a vacuum chamber 60 having a $CaF_2$ window 62. Chamber 60 reduces the "Q" spoiling effect of $H_2O$ and $CO_2$ at 2.8 $\mu$m. Another approach to accomplish the same purpose as chamber 60 would be to apply mirror coatings directly to the ends of laser rod 52.

The power at 1.54 $\mu$m from laser 20 is directed by reflector 32 to detector 34 for the purpose of power level monitoring and the power at 2.8 $\mu$m is reflected from window 70 through filter 72 to detector 74.

Figure 14:
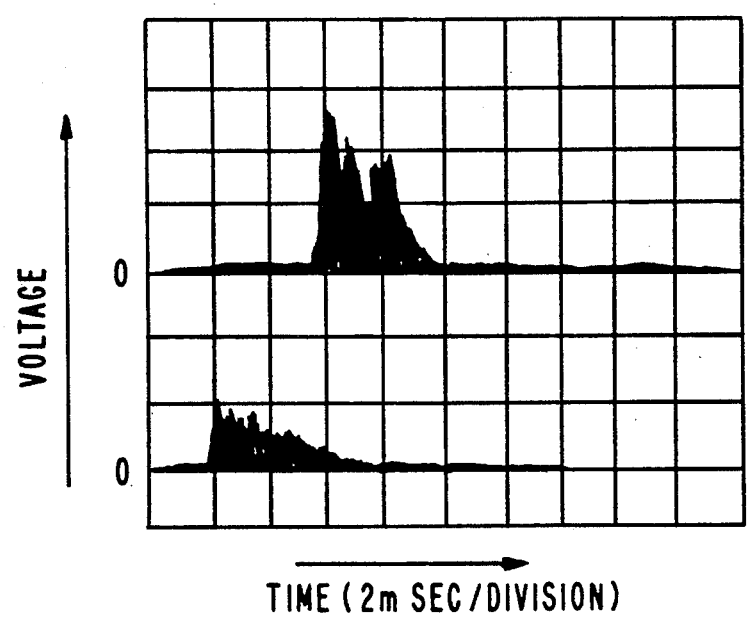
FIG. 14 depicts the emission of a $CaF_2$ (5% $Er^{3+}$) laser around 2.8 μm (upper trace) excited by 1.54 μm radiation of erbium glass laser (lower trace) at room temperature.

Initially, the mirrors and laser rods were aligned with a HeNe laser and then the lasers were fine tuned individually by pumping with the xenon flash lamps (not shown). At this juncture the flash lamps for laser 50 were disconnected and laser 50 was pumped with the 1.54 $\mu$m radiation only. FIG. 14 shows oscilloscope traces of 2.8 $\mu$m lasing (upper trace) produced by pumping with 1.54 m energy. The 1.54 $\mu$m pump pulses and the 2.8 $\mu$m upconversion laser pulses as detected by detectors 34 and 74, respectively.

Figure 11:
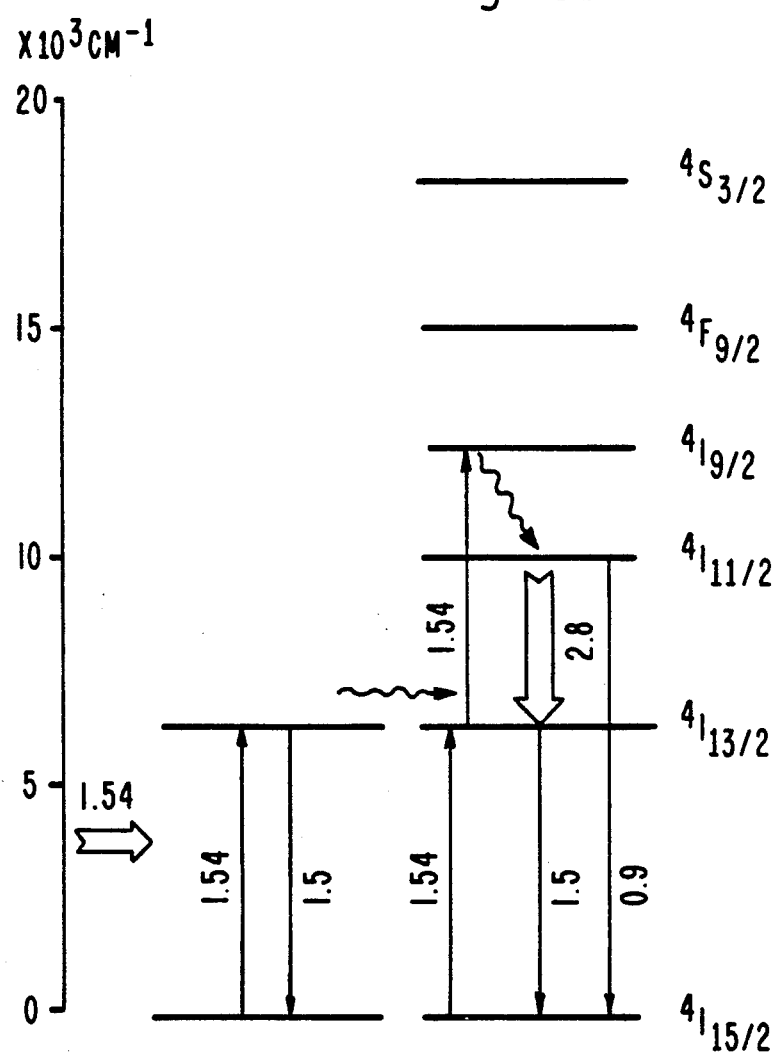
FIG. 11 depicts the energy levels involved in upconversion and laser pumping scheme for $^4I_{11/2} \rightarrow {}^4I_{13/2}$ transition in $CaF_2$ ($Er^{3+}$).

Thus, there has been described an upconversion laser utilized a pumping scheme based on upconversion of radiation absorbed into an energy state laying below the upper lasing state. For example, referring to FIG. 11, the 1.54 $\mu$m energy raises the $^4I_{15/2}$ ground state to the $^4I_{13/2}$ lower lasing state, up-conversion raises the energy level to the $^4I_{9/2}$ energy level which energy is subsequently transferred to the upper lasing state $^4I_{11/2}$. Following lasing to the $^4I_{13/2}$ state upconversion can recycle the energy through the just described cycle. Thus, the disclosed arrangement demonstrates that erbium ions alone, without assistance of sensitizing ions, are capable of upconversion IR radiation and pumping the $^4I_{11/2} \rightarrow ^4I_{13/2}$ laser transition.

Figure 15:
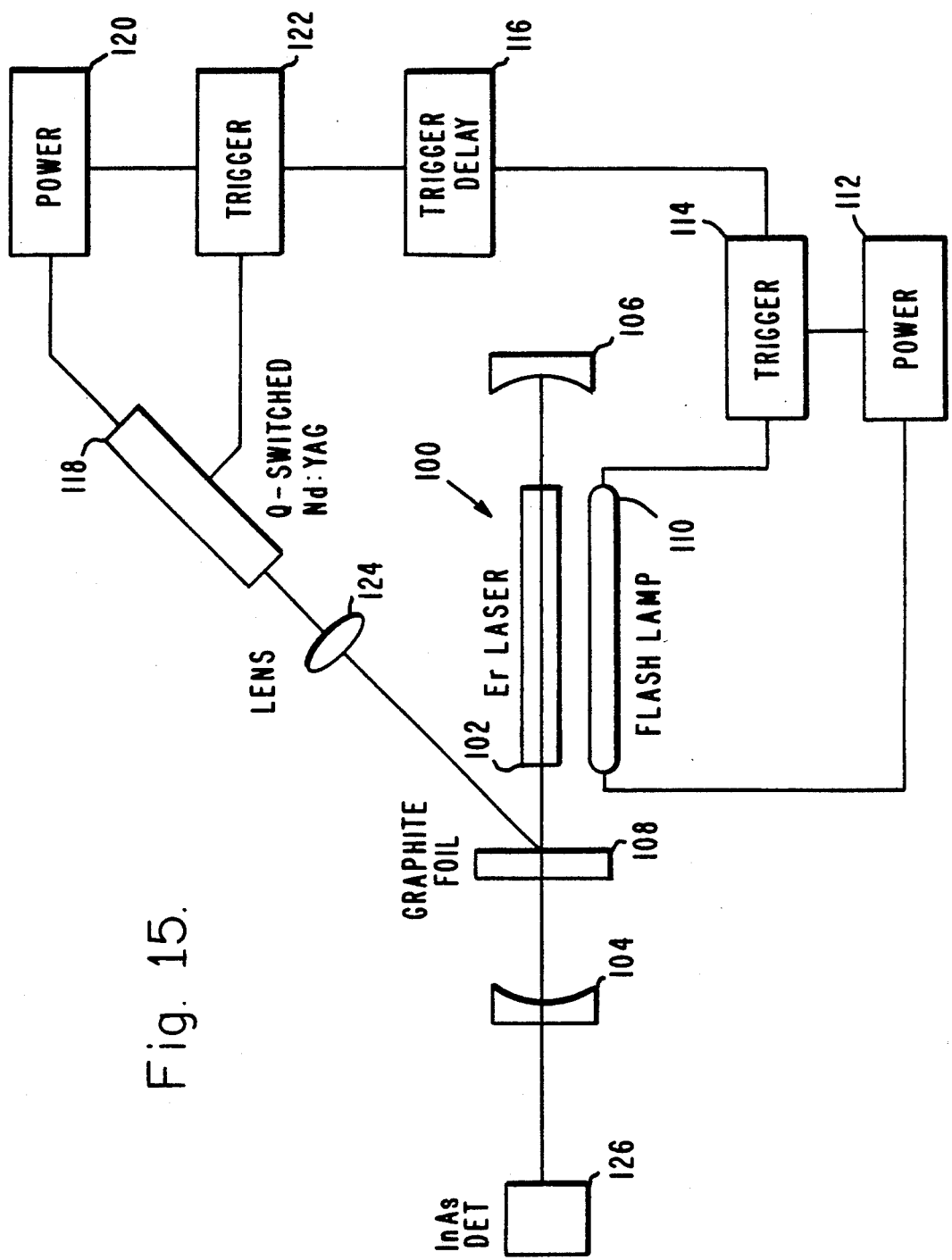
FIG. 15 is a schematic diagram of an arrangement for Q-switching of a $CaF_2$ ($Er^{3+}$) laser.

FIG. 15 shows an arrangement of the $^4I_{11/2} \rightarrow ^4I_{13/2}$ laser transition in a $CaF_2$ ($Er^{3+}$) laser which is Q-switched to produce a short, high amplitude pulse. In the laser arrangement 100 of FIG. 15, a $CaF_2$ ($Er^{3+}$) rod 102 is disposed in the laser cavity between mirrors 104 and 106 which are tuned for 2.8 $\mu$m lasing. A 100 $\mu$m thin graphite foil 108 is disposed in the lasing path.

Laser 100 includes a broad band pumping source shown as flash lamp 110 which operates with power source 112 and trigger unit 114 in a conventional manner. Conventional elliptical reflectors which encompass rod 102 and flash lamp 110 are not shown in FIG. 15. Although the pumping source shown in FIG. 15 is broad band it is noted that a selective narrow band pumping source, such as shown in FIG. 13, may be implemented with suitable modifications; such as a window in enclosure 60 (FIG. 13) to allow passage of "switching" energy from laser 118 (FIG. 15).

A trigger signal from unit 114 (FIG. 15) is delayed in unit 116, the output signal therefrom energizes Q-switched Nd:YAG laser 118, which is powered by unit 120. The output radiation from laser 118, for example a 20 nsec pulse, is focused by lens 124 onto foil 108. The focused energy punctures (ruptures and evaporates) a portion of the foil 108 allowing the production of a giant output pulse from laser 100 which is detected by InAs detector 126.

As described above, the upconversion process is a di-ionic (i.e. two photon) process. Two erbium$^{3+}$ ions absorb energy and one of them then gives up its absorbed energy to the other. The ion that gave up its energy then falls back to a ground state, while the ion that absorbed energy is raised to a higher energy state. One specific implementation of a di-ionic scheme has been thoroughly described herein with a specific reference to FIG. 11. Other di-ionic schemes are also possible, as are tri-ionic (three photon) schemes as mentioned earlier. In 1987 International Business Machines demonstrated upconversion pumped lasing in erbium$^{3+}$ ions at 550 nm using a di-ionic scheme. See "Green Infrared-Pumped Upconversion Lasers", W. Lenth, R. M. MacFarlane and A. J. Silversmith, Optics News, Vol. 13 No. 12 page 26 (1987). The U.S. Naval Research Laboratory also demonstrated upconversion pumped lasing in erbium$^{3+}$ ions using a di-ionic excitation scheme. In the di-ionic upconversion process, input laser excitation energy raises two ions to an elevated energy state. At the elevated energy state one of the excited ions gives up its energy to the other excited ion. The first excited ion then falls back down to its normal non-excited state. The other excited ion is further excited by the energy it acquired and is raised to a further and higher energy state. When the ion falls from the higher energy state, lasing occurs. The following are some examples of di-ionic upconversion.

Figure 16:
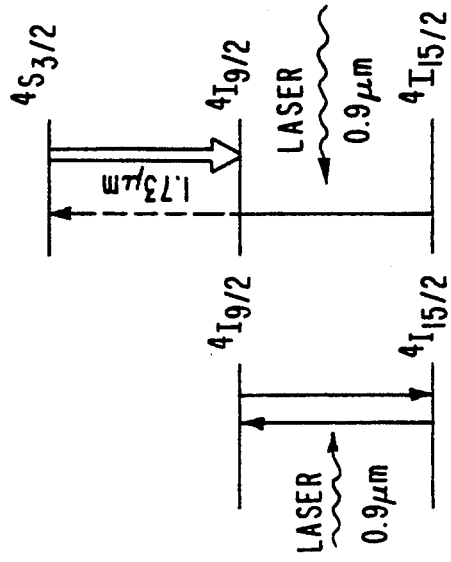
FIG. 16 illustrates a di-ionic upconversion scheme, in erbium$^{3+}$ ions.

FIG. 16 illustrates the di-ionic scheme demonstrated by IBM in 1987. Laser energy at 802 nm excites two erbium$^{3+}$ ions, raising them from the $^4I_{15/2}$ state to the $^4I_{9/2}$ state. One of the ions gives up its energy to the other and falls back to the $^4I_{15/2}$ state. The other ion is raised to the $4S_{3/2}$ energy state. When the ion falls from the elevated $4S_{3/2}$ state to the $^4I_{15/2}$ state, lasing occurs at 550 nm.

Figure 17:
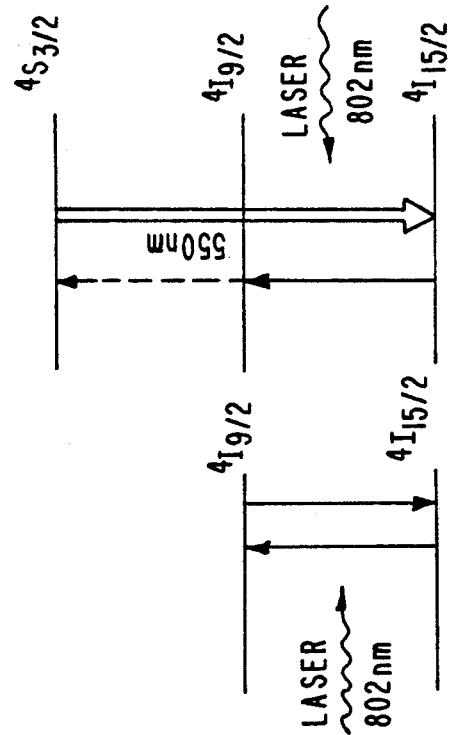
FIG. 17 illustrates a second di-ionic upconversion scheme, in erbium$^{3+}$ ions.

FIG. 17 illustrates the di-ionic upconversion scheme demonstrated by the Naval Research Laboratory in 1987. Laser energy at 0.9 um excites two erbium$^{3+}$ ions, raising them from the $^4I_{15/2}$ state to the $^4I_{9/2}$ state. One of the ions gives up its energy to the other and falls back to the $^4I_{15/2}$ state. The other ion is raised to the $^4S_{3/2}$ energy state as a result of the energy it obtained. When the ion falls from the elevated $^4S_{3/2}$ state to the lower $^4I_{9/2}$ state, lasing occurs at 1.73 um.

Figure 18:
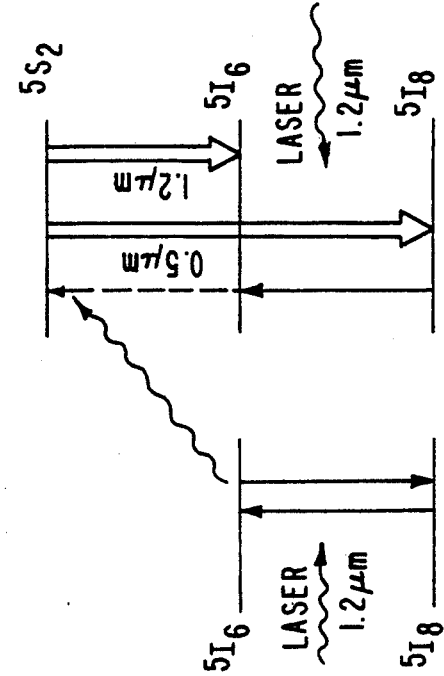
FIG. 18 shows yet a third di-ionic up conversion scheme, in erbium$^{3+}$ ions.

FIG. 18 illustrates the di-ionic upconversion scheme demonstrated by applicants in 1986 and described above at length herein. Laser energy at 1.54 um excites two Erbium$^{3+}$ ions, raising them from the $^4I_{15/2}$ state to the $^4I_{13/2}$ state by absorption.

$^4I_{15/2} + h\nu_{1.54} \rightarrow {}^4I_{13/2}$, for each ion.

One of the ions transfers its excitation energy to the other ion exciting it to the $^4I_{9/2}$ state.

$^4I_{13/2} - h\nu \rightarrow {}^4I_{15/2}, {}^4I_{13/2} + h\nu \rightarrow {}^4I_{9/2}$.

The excited ion transfers energy non-radiatively to the $^4I_{11/2}$ state, inverts its population and lases between the $^4I_{11/2}$ state and the $^4I_{13/2}$ state at 2.8 um.

Figure 19:
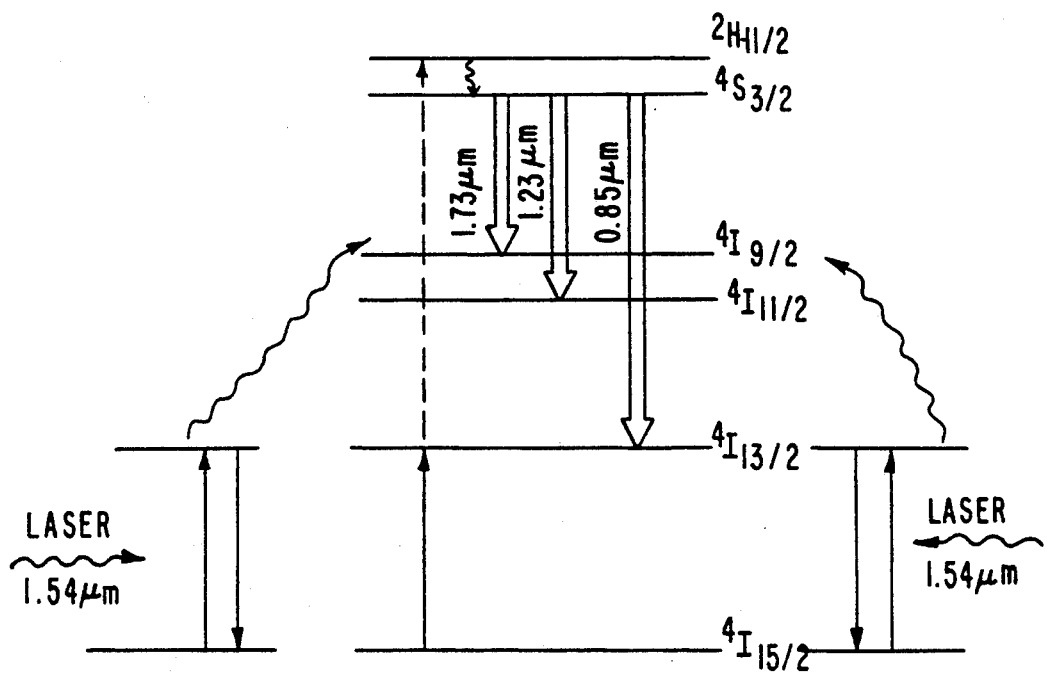
FIG. 19 shows a tri-ionic upconversion scheme, in erbium$^{3+}$ ions.

$^4I_{9/2} - h\nu \rightarrow {}^4I_{11/2}$, $^4I_{11/2} \rightarrow {}^4I_{13/2}$ lasing emission FIG. 19 illustrates a tri-ionic (three photon) upconversion scheme demonstrated by applicants in Er:YLF. An Er:glass laser emitting at 1.54um provides the pump (excitation) radiation. The (5% Er):YLF was maintained at 110 K for the output at the three wavelengths corresponding to the transitions $^4S_{3/2} \rightarrow {}^4I_j$ where j=9/2, 11/2 and 13/2.

The tri-ionic upconversion scheme is described as follows:

1. Three erbium$^{3+}$ ions are excited to the $^4I_{13/2}$ state through absorption of 1.54 um laser photons ($h\nu_{1.54}$).
2. Two of the ions transfer their excitation energy ($h\nu$ virtual) to the third ion exciting it to the $^2H_{11/2}$ excited state, and the first two ions return to their ground state ($^4I_{15/2}$ state).

$^4I_{13/2} - h\nu_{virtual} \rightarrow {}^4I_{15/2}$ (1st ion)

$^4I_{13/2} - h\nu_{virtual} \rightarrow {}^4I_{15/2}$ (2nd ion)

$^4I_{13/2} + 2h\nu_{virtual} \rightarrow {}^2H_{11/2}$ (3rd ion)

3. The excited ion transfers energy non-radiatively to the $^4S_{3/2}$ excited state, inverting its population. Lasing emission occurs at three wavelengths.

$^2H_{11/2} - h\nu_{non-rad.} \rightarrow {}^4S_{3/2}$

Laser emission $^4S_{3/2} \rightarrow {}^4I_{13/2}$ at 0.85 um $^4S_{3/2} \rightarrow {}^4I_{11/2}$ at 1.23 um $^4S_{3/2} \rightarrow {}^4I_{9/2}$ at 1.73 um For this three photon upconversion process, 99.9% reflectivity mirrors were used, and the input pump energy thresholds at 110K were approximately 5, 100 50 mJ for the 1.73 um, 1.23 um and 0.85 um laser lines respectively. The threshold values are temperature dependent, but are relatively constant in the temperature range between 110K and about 150K to $_{170}$K, and thereafter increase rapidly. The easiest to pump was the 1.73 um line. It lased with lower reflectivity mirrors, allowing efficiency measurements to be made.

Figure 20:
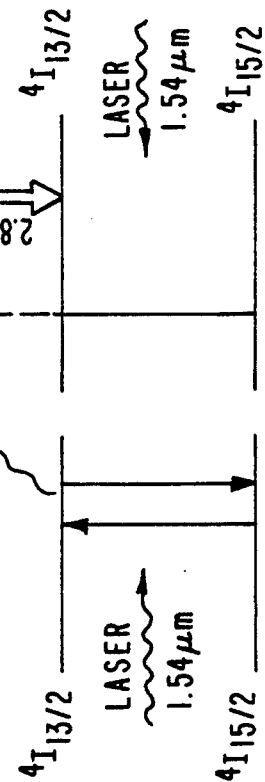
FIG. 20 shows an additional di-ionic upconversion process believed suitable for laser pumping, using holium $^{3+}$ ions.

FIG. 20 shows a di-ionic scheme with the host material doped with Holmium$^{3+}$ ions (Ho$^{3+}$). This particular implementation of the di-ionic scheme operates as follows.

1. Excitation energy is provided by a laser operating at 1.2 um wavelength.

2. Two Ho$^{3+}$ ions absorb energy from the laser radiation and are raised from the $^5I_8$ energy state to the $^5I_6$ energy state.

3. One of the excited ions gives up its energy to the other and falls back to the $^5I_8$ energy state. The ion which absorbed the released energy is further raised to the $^5S_2$ energy state.

4. Ions which have been raised to the $^5S_2$ energy state may fall back to the $^5I_6$ energy state resulting in lasing at 1.2 um, or may fall back to the $^5I_8$ energy state producing lasing at 0.5 um.

Figure 21:
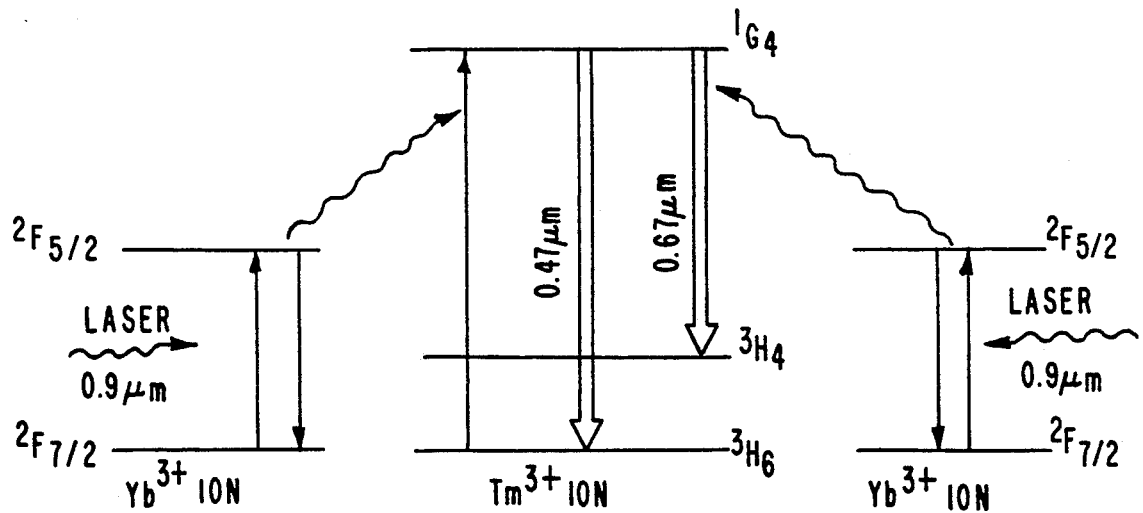
FIG. 21 shows a further tri-ionic scheme, using thulium$^{3+}$ ions with ytterbium$^{3+}$ ions as a catalyst.

FIG. 21 shows a tri-ionic (three photon) scheme with the host material doped with ytterbium$^{3+}$ (Yb$^{3+}$) and thulium$^{3+}$ (Tm$^{3+}$) ions. This particular implementation of the tri-ionic scheme is believed suitable of laser pumping, and operates as follows.

1. Excitation energy is provided by a laser emitting at 0.9 um wavelength.

2. The laser energy raises two Yb$^{3+}$ ions from the $^2F_{7/2}$ to the $^2F_{5/2}$ state. These two Yb$^{3+}$ ions act as a catalyst, giving up their energy to the Tm$^{3+}$ ion and falling back to the $^2F_{7/2}$ state.

3. The Tm$^{3+}$ ions are raised to the $^1G_4$ state. Some Tm$^{3+}$ ions fall from the $^1G_4$ state to the $^3H_6$ state producing lasing at 0.47 um, others fall from the $^1G_4$ state to the $^3H_4$ state producing lasing at 0.67 um.

The above merely illustrates specific implementations of di-ionic (two photon) and tri-ionic (three photon) processes mentioned early on herein. Each process makes use of upconversion as described in detail in this description and in the claims.

Hence, a new optical pumping scheme is described based on upconversion of radiation absorbed into the energy state lying below the upper laser state with vast potential, for example, of converting powerful infrared into intense visible and/or ultraviolet radiation that can then used for laser pumping. It will be appreciated that while the herein disclosure deals with a particular upconversion arrangement, it is understood that the invention is not limited thereto. Accordingly, any and all modifications, variations or equivalent arrangements which may occur to those skilled in the art are considered to be within the scope of the invention as defined in the following claims.

What is claimed is:

1. A laser arrangement comprising:
   a laser resonator cavity;
   a laser medium, that incorporates lasing ions, disposed within said laser resonator cavity, said laser medium containing upcoverting material which allows for exchange of energy between electrons of lasing ions at a given energy state below a meta-stable initial lasing state so that some of said exchanging electrons are upconverted to energy states at or above the meta-stable initial lasing state; and
   pumping means operably coupled to said laser medium for selectively applying excitation energy to said laser medium said selected excitation energy having only wavelengths which are longer than the wavelength corresponding to the energy difference between said meta-stable initial lasing state and a ground state and having an intensity suitable for elevating electrons from energy levels below said given state to said given state in sufficient numbers to support substantial upconversion and continuous lasing, said pumping means and resulting upconversion being capable of serving as a sole means for pumping said laser medium.

2. The laser arrangement of claim 1 wherein said upconverting material comprises erbium ions.

3. The laser arrangement of claim 2 wherein said laser medium comprises a calcium fluoride crystal hosing erbium ions.

4. The laser arrangement of claim 3 wherein said pumping means provides selected excitation energy at 1.54 um and lasing occurs between the $^4S_{3/2}$ and $^4I_{9/2}$ energy states, between the $^4S_{3/2}$ and $^4I_{11/2}$ energy states and between the $^4S_{3/2}$ and $^4I_{13/2}$ energy states.

5. The laser arrangement of claim 1 wherein said laser medium comprises a calcium fluoride crystal hosting erbium ions.

6. The laser arrangement of claim 5 wherein said calcium fluoride crystal contains 5 mole percent to 10 mole percent of erbium ions.

7. The laser arrangement of claim 5 wherein said pumping means providing selected excitation energy at 1.54 um and lasing occurs between $^4I_{11/2}$ and $^4I_{13/2}$ energy states.

8. The laser arrangement of claim 7 wherein said calcium fluoride crystal contains 5 mole percent to 10 mole percent of erbium ions.

9. The laser arrangement of claim 1 wherein the given energy state is a terminal state of lasing transition for the laser medium and the concentration of upconverting material is such that exchange of energy between electrons of the terminal energy state is sufficient to maintain population inversion between initial and terminal lasing states, whereby continuous lasing operation can be sustained in said laser medium in response to continuous excitation by said pumping means.

10. The laser arrangement of claim 1 wherein said upconverting material comprises thullium ions and ytterbium ions acting as a catalyst.

11. The laser arrangement of claim 10 wherein said pumping means provides selected excitation energy at 0.9 um.

12. The laser arrangement of claim 11 wherein lasing occurs between the $^1G_4$ and $^3H_6$ energy states and between the $^1G_4$ and the $^3H_4$ energy states.

13. The laser arrangement of claim 1 wherein said upconverting material comprises holmium ions.

14. The laser arrangement of claim 13 wherein said pumping means provides selected excitation energy at 1.2 um wavelength.

15. The laser arrangement of claim 14 wherein lasing occurs between the $^5S_2$ and $^5I_8$ energy states and between the $^5S_2$ and the $^5I_6$ energy states.

16. A laser arrangement comprising:
a laser resonator cavity;
a laser medium disposed within said laser resonator cavity, said laser medium comprising a calcium fluoride crystal rod hosting erbium ions; and
pumping means operably coupled to said laser medium to apply 1.54 um excitation energy to said laser medium.

17. The laser arrangement of claim 16 wherein said calcium fluoride crystal contains 5 mole percent to 10 mole percent of erbium ions.

18. A laser arrangement comprising;
a laser resonator cavity;
a laser medium, that incorporates lasing ions, disposed within said laser resonator cavity, said laser medium containing upconverting material which allows for exchange of energy between electrons of lasing ions at a given energy state below a meta-stable initial lasing state so that some of said exchanging electrons are upconverted to energy states at or above the meta-stable initial lasing state; and
pumping means operably coupled to said laser medium and said selected excitation energy having only wavelengths which are longer than the wavelength corresponding to the energy difference between said meta-stable initial lasing state and a ground state in sufficient numbers to support substantial upconversion and lasing in said laser medium between said meta-stable initial lasing state and said given state said pumping means and resulting upconversion being capable of serving as a sole means for pumping said laser medium.

19. The laser arrangement of claim 18 wherein said upconverting material comprises erbium ions.

20. The laser arrangement of claim 18 wherein said laser medium comprises a calcium fluoride crystal hosting erbium ions.

21. The laser arrangement of claim 20 wherein said calcium fluoride crystal contains 5 mole percent to 10 mole percent of erbium ions.

22. The laser arrangement of claim 20 wherein said pumping means provides energy at 1.54 um and lasing occurs between the $^4I_{11/2}$ and $^4I_{13/2}$ energy states.

23. The laser arrangement of claim 22 wherein said calcium fluoride crystal contains 5 mole percent to 10 mole percent of erbium ions.

* * * * *